US006554995B2

(12) United States Patent
Sprenger et al.

(10) Patent No.: US 6,554,995 B2
(45) Date of Patent: Apr. 29, 2003

(54) METHOD OF SEPARATING PETROLEUM-CONTAINING MATERIAL INTO FRACTIONS, EXTRACTION SYSTEM, AND EXTRACTION FLUID THEREFOR

(75) Inventors: George H. Sprenger, Las Vegas, NM (US); Teddy J. Martinez, deceased, late of Las Cruces, NM (US), Juana Martinez, legal representative

(73) Assignee: SM Technologies, Inc., Las Vegas, NM (US)

( * ) Notice: Subject to any disclaimer, the term of this patent is extended or adjusted under 35 U.S.C. 154(b) by 0 days.

(21) Appl. No.: 09/842,380

(22) Filed: Apr. 23, 2001

(65) Prior Publication Data

US 2001/0028054 A1 Oct. 11, 2001

Related U.S. Application Data

(63) Continuation-in-part of application No. 09/183,897, filed on Oct. 30, 1998, now abandoned.

(51) Int. Cl.[7] .................. C10G 21/28; C10G 21/14; C10G 21/16; C10G 21/18
(52) U.S. Cl. ............... 208/321; 208/309; 208/311; 208/324; 208/361; 208/365
(58) Field of Search ............... 208/311, 321, 208/324, 309, 361, 365; 585/867, 868, 914

(56) References Cited

U.S. PATENT DOCUMENTS

| | | | | | |
|---|---|---|---|---|---|
| 2,188,013 A | * | 1/1940 | Pilat et al. | | |
| 2,367,671 A | * | 1/1945 | Dickinson et al. | ...... | 208/311 X |
| 2,631,966 A | * | 3/1953 | Francis | .................... | 252/364 X |
| 4,191,639 A | * | 3/1980 | Audeh et al. | ................ | 208/309 |
| 4,375,387 A | * | 3/1983 | DeFilippi et al. | ........ | 208/321 X |
| 4,421,639 A | * | 12/1983 | Lambert et al. | ............. | 208/309 |
| 5,626,756 A | * | 5/1997 | Heidlas et al. | ............... | 210/634 |
| 5,944,984 A | * | 8/1999 | Benguigui et al. | .......... | 208/309 |
| 5,965,784 A | * | 10/1999 | Bracou et al. | .......... | 208/311 X |

* cited by examiner

*Primary Examiner*—Richard D. Lovering
(74) *Attorney, Agent, or Firm*—R W Becker & Associates; R W Becker

(57) ABSTRACT

A method of separating a petroleum-containing material into at least two fractions, an extraction system, and an extraction fluid therefor are provided. Petroleum-containing material as well as a solvent mixture comprising 50%–99% by volume sub-critical carbon dioxide and 1%–50% by volume of at least one co-solvent are introduced into an extraction column. The co-solvent can be propane, ethane, butane, propylene 2 methylpropane, 2,2 dimethylpropane, propadiene, dimethylether, chlorodifluoromethane, difluoromethane and methylfluoride. A fraction containing solvent mixture and solvated petroleum-containing material is removed from the top portion of the extraction column, while a dense fraction of the petroleum-containing material, as well as solvent mixture, is withdrawn from the bottom portion of the extraction column. Solvent mixture is recovered from the solvated petroleum-containing material.

11 Claims, 1 Drawing Sheet

METHOD OF SEPARATING PETROLEUM-CONTAINING MATERIAL INTO FRACTIONS, EXTRACTION SYSTEM, AND EXTRACTION FLUID THEREFOR

This application is a continuation-in-part application of Ser. No. 09/183,897 filed on Oct. 30, 1998 and now abandoned.

BACKGROUND OF THE INVENTION

The present invention relates to an extraction method for separating petroleum-containing materials into at least two fractions, and also relates to an extraction system, the solvent stripping system and an extraction fluid therefor.

An economical method to de-asphalt, fractionate and de-metalize various petroleum-containing materials is needed. The petroleum-containing materials can, for example, be waste/non-waste petroleum-containing materials such as used motor oil, virgin crude oil, vacuum tower bottoms, catalytic cracker tower bottoms, heavy oil, gas oil, tar sands/bitumin and the like.

Liquid carbon dioxide is cheap, plentiful and relatively benign in terms of toxicity and its effects on the environment when compared to other solvents. Unfortunately, carbon dioxide is a very poor solvent in the sub-critical or liquid phase, and it has little utility as an extraction fluid, especially for petroleum mixtures. Auerbach (U.S. Pat. No. 1,805,751) states that sub-critical carbon dioxide dissolves petroleum oils to form solutions of concentrations of 2 percent or less. Such extractions are highly inefficient because of the need to use and process large amounts of solvent to effect an appreciable quantity of oil.

Because sub-critical carbon dioxide is a poor solvent, recent research utilizing carbon dioxide as a solvent has been concentrated on the super-critical phase. The term super-critical as used in conjunction with a fluid refers to a highly compressed gas having a gas density approaching that of the liquid phase density. A super-critical fluid cannot be liquefied. A super-critical fluid can also be defined as a substance which is above the critical temperature and at a pressure above the critical pressure. The critical temperature is defined as the temperature above which a gas can never become a liquid regardless of the pressure. The critical pressure is defined as the pressure at which a gas can just be liquefied at the critical temperature. There are few or no intermolecular attractions (liquid bonds) in a super-critical fluid and therefore it will expand to fill the entire container. A super-critical fluid has no meniscus and the density of the fluid is constant throughout the container. This is contrasted with a true liquid which has a meniscus with the liquid phase (high density phase) at the bottom of the container and the vapor phase (low density phase) at the top of the container.

In modern chemical theory, a super-critical fluid is considered as a separate phase along with solids, liquids and gases. A phase diagram consisting of a temperature vs pressure plot shows lines dividing the solid, liquid and gaseous phases and a "triple point" where the three phases are in equilibrium. The same plot may also show the critical point where the liquid, gas and the super-critical phases are in equilibrium. Usually the boundary lines between the gas, liquid and super-critical phases are dashed because of the difficulty of measuring those boundaries. Even with this difficulty, it is well recognized that a super-critical fluid is a distinctly different phase from that of solids, liquids and gases.

Since there are few or no inter-molecular bonds or attractions in a super-critical solutions, the rule of liquid solubility (polar solvents dissolve polar solutes well and nonpolar solvents dissolve nonpolar solutes well) tends to be minimized. The general rule of solubility for super-critical solutions is solvents and solutes of like densities are soluble, which is very different from that of liquid solvent systems. To illustrate the dramatic differences in solubility characteristics between super-critical solvents and sub-critical solvents these examples are cited. Super critical water and oil are miscible. Elemental carbon is soluble in super-critical toluene. These examples indicate that it is improper to make inferences about a solution in one phase by utilizing empirical data from another phase. It is very important to consider which material is the solvent and the solute when considering systems where the solvent is of a different phase from that of the solute.

Despite claims to the contrary, carbon dioxide in the super-critical phase is actually not an exceptional solvent either. For this reason, Ohgaki et al, U.S. Pat. No. 5,138,075, starts at a somewhat sub-critical phase before heating to the super-critical phase. In addition, polar co-solvents such as water, methanol, and ethanol (<10%) have been added to super-critical carbon dioxide to increase the solubilities of potential solutes (see Dedieu et al, U.S. Pat. No. 5,329,045). Low volatile non-polar co-solvents have been added to carbon dioxide for extractions (see Heidlas et al, U.S. Pat. No. 5,626,756). Non-volatile surfactants have been used with sub and super-critical carbon dioxide in attempts to develop a commercial dry-cleaning process for clothing. The solubilities of non-gaseous materials in super-critical carbon dioxide are not great enough to be commercially useful except for very specialized food, medical and scientific applications. Caffeine extractions of coffee and tea, drug and drug precursors are extracted commercially utilizing super-critical carbon dioxide.

Kriegel, U.S. Pat. No. 4,522,707, discloses the use of gases, including carbon dioxide, at super-critical conditions for processing spent oil. There are several other patents pertaining to the use of super-critical carbon dioxide in the oil industry. Harris et al., U.S. Pat. No. 5,045,220 notes that carbon dioxide easily associates with various polymers, various light hydrocarbons and water to facilitate tertiary recovery of oil from oil fields.

Older patent references often referred to super-critical fluids as liquids. Francis (U.S. Pat. No. 2,631,966), for example, presented extensive solubility data and extraction methods for virgin lubricating oils utilizing carbon dioxide and various co-solvents including propane. The various solvent systems are referred to as liquids although the data and descriptions are often presented for temperatures and pressures greater than the super-critical conditions of the solvent.

Francis describes the conditions of most of his extractions with regard to a Plait point which describes what he refers to as the critical solution point. His critical point represents the solution conditions where two liquid phases in an extraction experiment disappear when the compositions of the phases approach each other through the variation of the solvation parameters. Great care is required in the interpretation of terminology used in the old literature.

Francis describes extractions involving a (type A) co-solvent as a co-solvent which is completely miscible in liquid carbon dioxide and partially miscible in the mixture to be separated. The second (type B) extraction involves a co-solvent which is partially soluble in carbon dioxide and partially miscible in the mixture to be separated.

The patent omits another type of extraction which would have a co-solvent which is completely miscible in carbon dioxide and also completely miscible in the oil. This case is the substance of our inventive process. The Francis extractions result in fractions which he terms extract-extract, extract-raffinate, raffinate-extract and raffinate-raffinate. The co-solvent and the carbon dioxide are separated after the extractions and solvents are reformulated before reuse. Our inventive process simply flash vaporizes and recycles the solvent and co-solvent without the separation of the solvent components and without the need for reformulation of the solvent upon reuse.

Liquid propane in the sub-critical phase is used to de-asphalt petroleum materials via salvation techniques (see Mellen, U.S. Pat. No. 5,286,380, Crowley, U.S. Pat. No. 4,169,044, Wezel, U.S. Pat. No. 4,797,198, and Vu, U.S. Pat. No. 3,773,658). Propane easily solvates oils which are removed from a mixture then heated to the super-critical phase to lower the solubility and to recover the oils. Small quantities of carbon dioxide, hydrogen sulfide, etc. have been added to modify or lower the solvent properties of propane. (see, for example, Yoon et al, U.S. Pat. No. 5,587,085, and Heidlas et al, U.S. Pat. No. 5,616,352). It should be noted that propane as an extraction fluid is too good of a solvent to efficiently fractionate petroleum mixtures. Lipid oils and cholesterol from various sources have been extracted using pure propane and propane with small quantities of co-solvents, such as carbon dioxide.

Van Dijck (U.S. Pat. No. 2,281,865) utilized extraction separations by commingling a pure solvent with a petroleum mixture. Various low molecular weight, high volatile solvents including pure propane and pure carbon dioxide were utilized. After an equilibrium solution was reached the pressure was released step-wise resulting in the settling of a high molecular weight fraction layer. The separated layer was removed before the pressure was lowered to the next step. The step-wise lowering of the pressure and the resultant requirement for the formation of a new equilibrium restricted the separation to a batch process method. The temperatures of these extractions were usually below but near the critical temperatures of the solvent.

Webb (U.S. Pat. No. 2,246,227) diluted lubricating oils with propane and then treating the resulting solutions with methane to produce separations of oils into fractions of different densities.

Lantz (U.S. Pat. No. 2,188,051) utilized low molecular weight hydrocarbon solvents (7 carbons or less) to solvate the oil under consideration. The solvent properties of the light hydrocarbon are then modified with the addition of carbon dioxide to form petroleum fractions of lower and higher viscosities. He further states that the extractions work best utilizing branched chain hydrocarbon solvents such as isobutane and isopentane solvents and in solvent concentrations of 75% or more. The recovery of the solvent components requires separate systems to recover the carbon dioxide and the hydrocarbon solvent.

It is an object of the present invention to provide an improved and economical method to de-metalize, de-asphalt and fractionate petroleum-containing materials such as used motor oil or virgin light crude oil, heavy crude oils and tar sands/bitumen using specific sub-critical solvent/co-solvent mixtures.

It is another object of the present invention to clean diesel fuels, fuel oils, aviation gasoline and other fuels.

It is a further object of the present invention to clean and separate oil from earthen materials after oil spills as well as to clean oil from plastics prior to plastic recycling.

It is also an object of the invention to separate the constituents of extremely viscous materials such as cracker tower bottoms and gas oils.

It is a further object of the present invention to provide an extraction system to carry out such a method.

It is another object of this invention to efficiently separate the solvent/co-solvent mixture from the extract products in a simple single step process while maintaining a constant solvent to co-solvent ratio.

It is also an object of this invention to utilize much of the heat of vaporization obtained from the solvent recovery system to vaporize the solvent in the solvent stripping system.

BRIEF DESCRIPTION OF THE DRAWING

These and other objects and advantages of the present invention will be described in detail subsequently in conjunction with the accompanying schematic drawing, which is a flow diagram explaining the inventive method in conjunction with one exemplary embodiment of the inventive extraction system.

SUMMARY OF THE INVENTION

Figure 1:
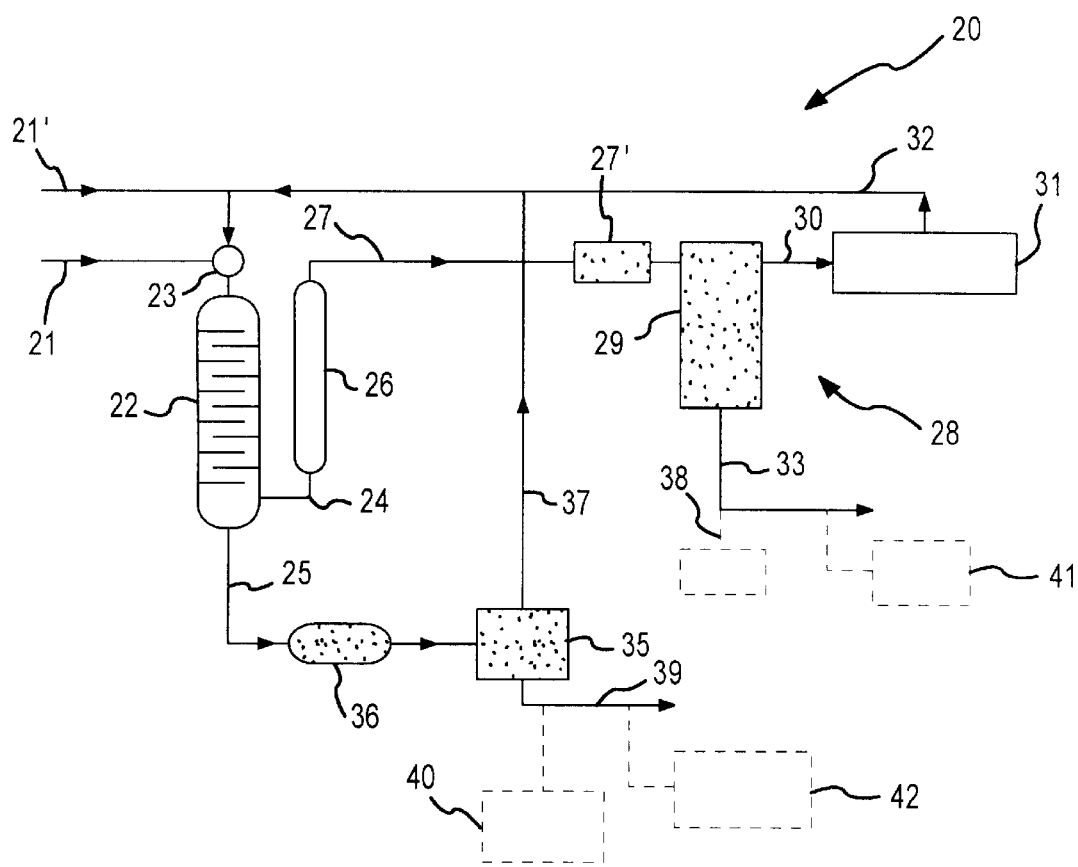

The method of the present invention is characterized primarily by introducing into an extraction vessel, such as an extraction column, petroleum-containing material as well as a solvent mixture comprising 50%–99% by volume sub-critical carbon dioxide and 1%–50%, especially 5%–40%, by volume of at least one high volatile co-solvent (with an ambient boiling point of 0° C. or lower), which can be propane, ethane, butane, propylene, 2 methylpropane, 2,2 dimethylpropane, propadiene, dimethylether, chlorodifluoromethane, difluoromethane, methylfluoride and others; a fraction containing solvent mixture and solvated petroleum-containing material, and a dense fraction of the petroleum-containing material, as well as solvent mixture, are removed from the column upon the formation of a density gradient within the column.

Thus, it can be seen that solvent mixtures comprising sub-critical liquid carbon dioxide and high volatile co-solvents are used to solvate one or more petroleum products that are desired to be removed from petroleum-containing material. For example, asphalts, partial oxidation products, water, wear metals and other contaminants are insoluble in the solvent mixtures and are separated from the desired oil product in the extraction system. The highly volatile, low-flammable solvents are easily stripped from the extracted materials and can be reused without reformulation. The mild temperature conditions of the fractionation eliminate any pyrolysis product formation.

The low-flammable extraction fluids are used to solvate the desired component or components from the petroleum containing material in a separation or extraction column that is thermostated at, for example, 0° C. The extracted oil/solvent mixture is removed from the column and passes a pressure reducing regulator, thus maintaining sub-critical conditions, into a degassing boiler that is thermostated at, for example, 80° C. It is to be understood that other suitable means of degassing or separating the extraction fluid or mixture can be utilized. The high volatile solvent mixture easily distills at constant pressure from the boiler to a condenser at, for example, 0° C. for immediate reuse. The extracted oil remains in the degassing boiler which has a temperature low enough to prevent any pyrolysis products. The differential between the condenser temperature and the boiler temperature is low enough to allow for a simple refrigeration system to pump the heat from the cold solvent condenser to the hot degassing boiler. The solvent mixture is then the working fluid for the refrigeration system. A wellinsulated extraction system consumes very little energy during operation. The solvent/co-solvent extraction fluids tend to lower the viscosities of petroleum mixtures so that high viscosity or dense petroleum feedstocks can be separated with ease. The high volatility of carbon dioxide based solvents as compared to higher molecular weight based solvents offers an advantage in degassing the recovered oils.

The co-solvent or co-solvents that are mixed with the liquid carbon dioxide to produce the solvent mixture will greatly modify the solubility of materials in the mixture. For example, with the present invention the solubilities of petroleum oils can be increased from about 0.05% in pure carbon dioxide to about 10% in a 25% propane/75% carbon dioxide mixture. The proper propane/carbon dioxide ratio of the extraction fluid is important for a successful extraction. For example, if the ratio is too small, the extraction rate is slow, although with good component differentiation. Conversely, if the ratio is too large, the extraction rate is more rapid, but with poor component differentiation. The extraction temperature is also important in order to obtain efficient extractions. Presently, the most effective extraction temperature appears to be at about 0° C. for petroleum products. Lower temperatures result in slow extractions but with good component differentiation, while higher temperatures result in higher extraction rates but with poor component differentiation.

In general, where the solvent mixture contains 25% by volume or less propane, the solubilities of low molecular weight hydrocarbon compounds are greater than high molecular weight hydrocarbons. The solubilities of light aromatic hydrocarbons are slightly greater than light aliphatic hydrocarbons. Wear metals or partial oxidation products in used motor oils remain in the insoluble or dense black, tarry, asphalt-like fraction.

The high volatile co-solvents are essentially miscible in the petroleum-containing material in all concentrations and have a vapor pressure of one atmosphere or greater at 0° C. The petroleum-containing materials must have a vapor pressure of less than 0.1 atmosphere at 0° C. and a specific gravity of 0.8 or greater.

With the present invention, it is also possible to obtain more than two fractions from a feed stock where the feed stock contains three or more petroleum components. By way of example, the low density solvated fraction extracted from the extraction column utilizing a first solvent mixture could contain two or more components that could than be further separated utilizing a second column and second solvent mixture. Similarly, the dense fraction of the petroleum-containing material withdrawn from the bottom portion of the extraction column could contain two or more components, which could then also be separated further utilizing a different solvent mixture. The petroleum-containing material could be processed either in a batch system, or in a continuous flow system utilizing two or more extraction columns. Separate degassing systems would of course be needed to recover the different solvents involved and to prevent cross contamination of the various solvents.

Further specific features of the present invention will be described in detail subsequently.

DESCRIPTION OF PREFERRED EMBODIMENTS

While the various features of this invention are hereinafter illustrated and described as providing an extraction system for re-refining used oil, such as motor oil, this is done by way of example only and it is to be understood that the various features of this invention can be utilized singly or in various combinations thereof to provide an extraction system to separate any number of petroleum-containing materials into at least two fractions.

Therefore, this invention is not to be limited to only the embodiment illustrated in the drawing, because the drawing is merely utilized to illustrate one of the wide variety of usages of this invention.

Referring now to the drawing in detail, FIG. 1 illustrates an exemplary embodiment of the extraction system of this invention, which is indicated generally by the reference numeral 20.

Used motor oil, or other petroleum-containing material and solvent mixture, the composition ratio of which is contingent upon the particular petroleum feedstock, are introduced via the lines 21 and 21', 32 respectively through a mixing orifice 23 into the top portion of an extraction tower or column 22, which is held at an appropriate thermostated temperature, for example 0° C. The pumping rates of both the used oil and the solvent mixture are carefully adjusted to match extracted oil rate to prevent column flooding and/or inefficient extraction. The petroleum-containing material and the solvent mixture can be introduced into the column 22 in any convenient manner, including pumping and spraying. The used motor oil is then allowed to percolate down through the packing material (which is flooded with the less dense solvent mixture) of the column; such packing material may comprise, for example, metal shot, glass beads, trays or other packing materials, depending upon the petroleum feedstock that is being separated. Packing material is generally needed for efficient solvation and to break up and reduce solvent/oil suspensions. It should be noted that the viscosity of a highly viscous feedstock can be lowered by making a saturated solution/suspension of the feedstock, which can then be easily introduced into the extraction column 22 at the appropriate extraction temperature.

To prevent agitation and to facilitate the settling of the most dense fractions of the used motor oil, such as tarry oxidation products, water and wear metals, a series of closely spaced baffles are placed in the bottom portion of the extraction column 22 below the oil solution exit line 24. The dense fractions of the used motor oil that have settled to the bottom of the extraction column 22 are removed, for example, via the line 25.

Solvent mixture and the solvated oil are removed from the bottom portion of the extraction column 22 and are conveyed, for example via the large volume line 24, to a vertical settling chamber 26, which may be open or packed, to remove any remaining entrained dense fraction. The dense fraction, obtained from chamber 26, simply flows down and back through line 24 to line 25. The less dense solvent oil solution is removed from the top portion of chamber 26, for example via line 27, which may or may not contain a pressure reducing regulator 27', to the first solvent and petroleum recovery portion 28. The recovery process involves first introducing the solvent mixture and solvated fraction into the degassing boiler 29, which is held at a temperature of, for example, 80° C. The highly volatile solvent mixture simply distills out of the extracted oil (flash volatilization) and passes, for example via a large volume tube 30, into the condensing tank 31, which is held at a temperature of about 0° C. From the condensing tank 31, the solvent mixture can be conveyed back via the line 32 to the extraction column 22 for immediate reuse as the extraction fluid. The extracted oils remain at the bottom of the degassing boiler 29 and can be removed as re-refined oil via the line 33. Appropriate valves can be provided in the various lines.

The dense fraction that is removed from the bottom of the extraction column 22, and which also contains some solvent mixture, is conveyed via the line 25 to the second solvent and petroleum or waste recovery portion 35, for example via the interposition of a heater 36. Solvent recovered in the recovery portion 35, for example by flash vaporization, is also returned to the extraction column 22 for immediate reuse, for example via the line 37 or via the condensing tank 31. Residual solvent remaining in the extracted oil fraction coming from the degassing boiler 29 can also be recovered in a recovery portion, similar to the recovery portion 28 or 35, as indicated by the dashed line 38. The high density fraction of the petroleum-containing material, such as asphalt, as well as metal, partial oxidation products, etc., is removed from the second solvent and petroleum or waste portion 35 via the line 39. Residual solvent remaining in the asphalt can be recovered in a further recovery portion 40. It should be noted that the composition of the extraction fluid does not change with use, and therefore does not need to be replaced or reformulated very often.

Although the present invention has been described as introducing both the petroleum-containing material and the solvent mixture into a top portion of the extraction column, it is to be understood that a countercurrent arrangement would also be possible. In such a case, the solvent mixture would be introduced into a lower portion of the column; removal of solvated material could be from the top of the column.

As indicated above, the extraction fluid can be used to separate used crankcase oil into two fractions. The first fraction consists of an amber oil with a yield of about 90%, depending upon the source of the used oil. The heavy second fraction contains asphalts, partial oxidation products, wear metals and water in a yield of about 10%. The solvent mixture effectively releases metal particles from the motor oil additive/wear metal suspensions that are found in used motor oils. The low viscosity of the oil/solvent mixtures allows for the settling of the asphalts, partial oxidation products, wear metals and water in a column, such as the extraction column 22. The solvent flow rate within the column is about 5 cm /min to 40 cm/min depending upon the degree of separation required.

As discussed previously, where the feedstock contains three or more petroleum components, more than two fractions can be obtained. This can be accomplished in a batch-type process, or could expediently be accomplished sequentially, and hence in a continuous flow system. Thus, for example, if the extracted oils or other material removed from the bottom of the degassing boiler 29 contain two or more components, such extracted oils could be processed in the further system 41 that is indicated by dashed lines. Such a system would include at least one further extraction column, to each of which different solvent mixtures would be added depending upon the components of the extracted oils, from which the various components could then be extracted sequentially. Similarly, if the asphalt or other high density fraction of the petroleum-containing material that is recovered in the portion 35 contains two or more components, such high density fraction could be processed in a further system 42, again as indicated by dashed lines Further applications for the extraction fluid include, for example, the separation of catalytic cracker bottoms into two principal fractions. The first fraction is a yellow light cycle oil (about 60% yield) which slowly oxidizes and darkens with time and air. Some fractionation occurs during the progression of a batch-type extraction. Heavier waxy fractions are obtained as the extraction progresses. Although the light cycle oil contains sulfur compounds, it is compatible for blending with diesel fuel. The second fraction is a heavy brown sticky tar-like material that softens at about 80° C. This material may be suitable for carbon black production or for compounding with road asphalt.

In addition, vacuum tower bottoms can be separated, resulting in an oil and a crumbly black solid material. Gas oil, which is a distillate from vacuum tower distillations, can also be separated into a heavy clear amber oil and a heavy brown sticky tar-like material (<2%), as described above. The amber oil can then be cracked to various fuels with less catalytic contamination. In addition, a mixture of aromatic and aliphatic hydrocarbons can be partially separated into two fractions. One fraction is enriched in aromatic hydrocarbons, and the other is enriched in aliphatic hydrocarbons. A crude oil can be separated into a light combustible fuel, a heavy combustible fuel, an amber oil and a crumbly asphalt residue. The yields of these components are variable depending upon the crude oil source.

Paraffin wax can be precipitated from an octane-paraffin wax solution. Asphalt can be precipitated from an octane-asphalt solution. Residual oil and bitumen can be separated from road asphalt and tar sand. In addition, asphalt and oil can be separated from light hydrocarbons such as hexane, gasoline, kerosene, toluene, benzene etc. Hydrocarbons can be extracted or separated from organic and aqueous phases. For example, xylenes can be separated from ethylene glycol or glycol based solvents. Oils can be separated from aqueous phases. Contaminants such as water, dirt, dust, metals and asphalt can be removed from contaminated aviation fuel. Some cutting oils can be regenerated when the metal contaminants are removed.

EXAMPLE 1

An 80% carbon dioxide/20% propane mixture was used to re-refine used motor oil. Depending upon the used oil that was processed, the amber base oil fraction obtained was in the 85%–90% yield relative to the original used motor oil, and an asphaltic fraction was obtained in a range of 10%–15% yield. The metal contaminants in the recovered base oil motor oil were generally reduced to the 0–3 ppm range.

EXAMPLE 2

Cracker tower bottoms can be extracted with a 60% carbon dioxide/40% propane mixture, whereby a yellow light cycle oil in yields of up to 60% can be obtained. The remaining 40% has an improved carbon-to-hydrogen ratio which makes it more suitable for the production of carbon black or as an additive to road asphalt.

EXAMPLE 3

Used motor oil was extracted using a 60% carbon dioxide/ 40% propane mixture. A blackish oil product was obtained at a yield of >90%, and was free of water and metal contaminants. This product was suitable for use as fuel oil or as cracker feedstock.

EXAMPLE 4

A light hydrocarbon (hexane, gasoline, toluene, kerosene etc.)/oil mixture can be extracted using a 95% sub-critical carbon dioxide/5% propane mixture. Three fractions comprising C5 to C10, C10 to C17, and heavier oils are obtained.

EXAMPLE 5

Shredded plastic bottles contaminated with oil were extracted with a 60% carbon dioxide/40% propane mixture. The oil was removed, leaving behind clean plastic material that can be recycled.

EXAMPLE 6

Contaminated aviation fuel can be extracted using a 80% carbon dioxide/20%propane mixture. A clean aviation fuel of up to 100% yield can be obtained, with the contaminants such as water, metal, dirt and lint being left as residue.

The present invention is, of course, in no way restricted to the specific disclosure of the specification and drawing, but also encompasses any modifications within the scope of the appended claims.

What is claimed:

1. A method of separating a petroleum-containing material into at least two fractions, including the steps of:
   introducing into an extraction column petroleum-containing material as well as a solvent mixture comprising 50%–99% by volume sub-critical carbon dioxide and 1%–50% by volume of at least one co-solvent selected from the group consisting of propane, ethane, butane, propylene, 2 methylpropane, 2,2 dimethylpropane, propadiene, dimethylether, chlorodifluoromethane, difluoromethane and methylfluoride;
   operating said extraction column at 0° C. or less;
   allowing the petroleum-containing material to percolate down through said extraction column;
   removing from said extraction column a fraction containing solvent mixture and solvated petroleum-containing material;
   withdrawing from a bottom portion of said extraction column a dense fraction of said petroleum-containing material; and
   conveying said removed fraction of solvent mixture and solvated petroleum-containing material to a recovery unit for separating solvent mixture from solvated petroleum-containing material.

2. A method according to claim 1, wherein said introducing step comprises introducing said petroleum-containing material into a top portion of said extraction column and introducing said solvent mixture into a lower portion of said extraction column, and wherein said removing step comprises removing said fraction containing solvent mixture and solvated petroleum-containing material from a top portion of said extraction column.

3. A method according to claim 1, wherein said solvent mixture comprises 5%–40% by volume of said co-solvent.

4. A method according to claim 3, wherein said co-solvent is propane.

5. A method of separating a petroleum-containing material into at least two fractions, including the steps of:
   introducing into an extraction column petroleum-containing material as well as a solvent mixture comprising 50%–90% by volume sub-critical carbon dioxide and 1%–50% by volume of at least one co-solvent selected from the group consisting of propane, ethane, butane, propylene, 2 methylpropane, 2,2 dimethylpropane, propadiene, dimethylether, chlorodifuoromethane, difluoromethane and methylfluoride, wherein said introducing step comprises introducing both said petroleum-containing material and said solvent mixture into a top portion of said extraction column;
   allowing the petroleum-containing material to percolate down through said extraction column;
   removing from a lower portion of said extraction column a fraction containing solvent mixture and solvated petroleum-containing material;
   withdrawing from a bottom portion of said extraction column a dense fraction of said petroleum-containing material; and
   conveying said removed fraction of solvent mixture and solvated petroleum-containing material to a recovery unit for separating solvent mixture from solvated petroleum-containing material.

6. A method according to claim 5, wherein said petroleum-containing material is selected from the group consisting of used motor oil, light and heavy oils, cracker or vacuum tower bottoms, tar sands and gas oils.

7. A method according to claim 5, which includes the steps of conveying solvent mixture from the recovery unit to a condensing tank, and transferring thermal energy or heat of condensation recovered in said condensing tank back to said recovery unit.

8. A method according to claim 5, wherein said recovery unit is a degassing boiler for flash volatilization of said solvent mixture, without separation of the substituents thereof, from said removed fraction.

9. A method according to claim 8, which includes the step of returning solvent mixture from said recovery unit to said extraction unit.

10. A method according to claim 8, which includes the step of conveying said extracted dense fraction and any solvent mixture contained therein to a second recovery unit for recovering said solvent mixture.

11. A method according to claim 10, which includes the step of submitting at least one of said solvated petroleum-containing material and said dense fraction to further extraction to further separate said solvated petroleum-containing material and/or said dense fraction.

* * * * *